F. H. ROBERTS.
VALVE FOR PRESSURE PUMPS.
APPLICATION FILED MAY 1, 1911.
1,014,178.
Patented Jan. 9, 1912.
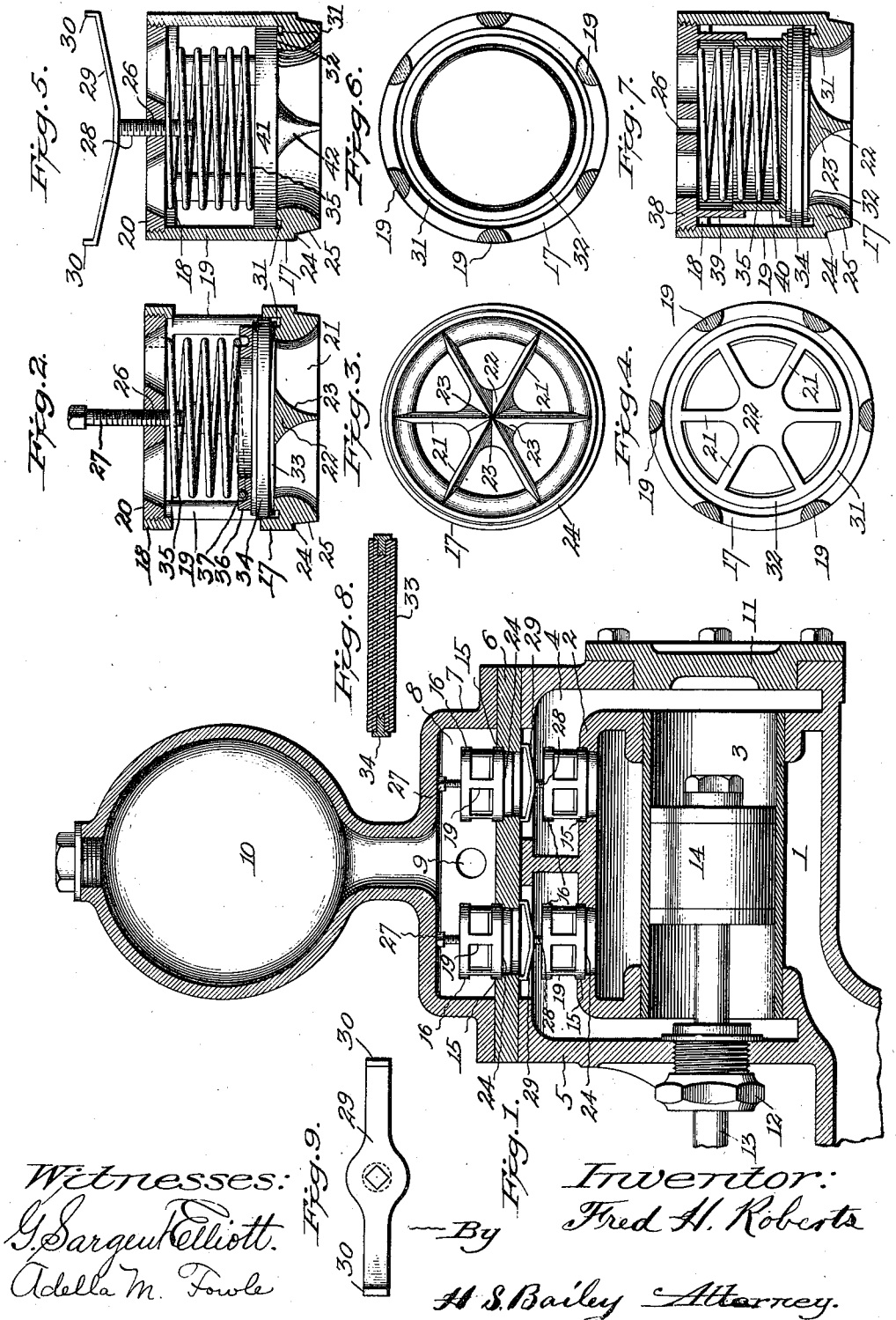

UNITED STATES PATENT OFFICE.

FRED H. ROBERTS, OF STERLING, COLORADO.

VALVE FOR PRESSURE-PUMPS.

1,014,178.  Specification of Letters Patent.  Patented Jan. 9, 1912.

Application filed May 1, 1911. Serial No. 624,313.

*To all whom it may concern:*

Be it known that I, FRED H. ROBERTS, a citizen of the United States of America, residing at Sterling, county of Sedgwick, and State of Colorado, have invented a new and useful Valve for Pressure-Pumps, of which the following is a specification.

This invention relates to improvements in valves for pressure feed pumps.

The objects of the invention are: First, to provide a valve which is held at all times in a position concentric with its seat, thus preventing uneven wear. Second, to provide a solid disk valve which is retained within a removable cage which holds it concentric with its seat and prevents it from cocking while in operation. And third, to provide a removable cage having a valve seat adapted to effect a uniform distribution of the water passing through it, and that will give a greater efficiency of flow of water and other fluids through it over valves of the stem type at present in use, and a spring pressed disk valve on said seat, which is guided in its movements by the sides of the cage; such construction eliminating the usual guide pin which passes through a central aperture in the valve, which aperture, in time, becomes oblong from wear and allows the valve to assume a position eccentric to its seat.

These objects are accomplished by the arrangement and construction of valve illustrated in the accompanying drawings, in which:

Figure 1, is a section view of a portion of a pressure feed pump, the improved valve being shown in connection therewith. Fig. 2, is a vertical sectional view of one of the valve cages, showing the valve and the spring for holding the same upon its seat. Fig. 3, is a bottom view of the valve cage. Fig. 4, is a horizontal sectional view through the cage, looking down upon the valve seat. Fig. 5, is a vertical sectional view of a modified form of cage, in which the spider arms forming the water distributers are dispensed with, and a valve is employed having a depending, pointed lug adapted to take the place of the said arms. Fig. 6, is a horizontal, sectional view of the form of cage shown in Fig. 5. Fig. 7, is a vertical, sectional view of a form of valve cage similar to that shown in Figs. 2, 3, and 4, but in which the cage closure or cap is provided with a depending band which is adapted to engage, telescopically, with a similar band projecting from a disk which rests upon the valve, by which the valve, when in operation, is prevented from cocking, said bands also inclosing the valve controlling spring. Fig. 8, is a vertical, sectional view of the preferred form of valve, and Fig. 9 is a plan view of the device for holding the lowermost valve cages in their seats.

The valves of pressure pumps in common use consist of rubber disks, which are mounted upon guide pins, which extend through central openings in the disks, coil springs being interposed between heads or abutments on the pins, and the disks or valves to hold the same upon their seats. A valve of this character soon becomes defective, owing to the wear upon the surface of its guide aperture, which gradually assumes an oblong form, which permits the valve to rise and fall in a position eccentric to its seat. Water is thus permitted to pass through the worn, oblong opening, and when the opening becomes large, the valve shifts far enough from its true center to partially uncover the seat, thus greatly decreasing the efficiency of the pump. The present invention is designed to overcome this defect by providing a solid valve and one which always rises and falls in a position concentric with the valve seat.

In the accompanying drawings, the numeral 1 indicates the intake chamber of a pressure pump which is of a style in common use. The casing 2 of this chamber partially surrounds a cylinder 3, which is mounted in openings in the opposite ends of the casing. This cylinder is open at both ends and communicates with a receiving chamber 4 which surrounds the intake chamber, and is formed by the outer casing 5 of the pump, the casings 5 and 2 being integral, as shown. The top of the outer casing 5 is closed by a valve plate 6, and a water cap 7 is secured upon the valve plate, and forms, with the same, an outlet chamber 8, having an outlet opening 9. The top of the water cap terminates in an air chamber 10, which communicates with the outlet chamber 8. The outer casing 5 is closed at one end by a head 11, and in the other end of the casing, in axial line with the head, is fitted a suitable packing box 12, through which passes a piston rod 13, which extends into the cylinder 3, and is provided with a piston 14.

The construction above described is of a style of pump in common use, and which therefore forms no part of the present invention, which relates to an improved form of valve adapted for use in connection with pumps of this class. In these pumps the valves are arranged in two pairs, one pair being in the top of the casing of the intake chamber and forming a means of communication between the intake and receiving chambers, while the other pair is supported in the valve plate and form a means of communication between the receiving and outlet chambers, as will be understood by reference to Fig. 1 of the drawings. As these valves are similar in construction, a description of one of them will suffice.

The inner casing 2 and valve plate 6, are provided with pairs of circular apertures 15, those in the casing being in line with those in the plate, and in each of these apertures is seated a cage 16. Each of these cages comprises a lower ring or band portion 17, an upper ring portion 18, and integral bars 19, connecting the upper and lower portions. The upper band is internally threaded and receives an apertured cap plate 20. Integral spider arms 21 connect the lower band or ring 17, with a central conical lug or hub 22, which is adapted to divide and direct the water uniformly through the openings formed by the arms 21, and out through the bars of the cage, and in order to reduce the resistance to the water to a minimum, the arms 21 are wedge shaped in cross section, their lower edges being sharp, as clearly shown in Fig. 3. The central hub 22 is formed by the junction of the spider arms, and where each pair of arms unites, an upwardly and outwardly flaring channel 23 is formed, the object of which is to direct the volume of water passing up between each two arms, so that the several jets of water will pass radially out through the cage, thus insuring uniformity of pressure upon the under side of the valve at all points, which tends to prevent cocking of the same. The bars 19 of the cage are in line with the spider arms 21, so that the open spaces between them coincide with the spaces between the spider arms, thus reducing the resistance to the exit of the water from the cage. These bars are also of the form in cross section, shown in Figs. 4 and 6, so as to offer the least possible resistance to the outwardly flowing water. The inner surface of the lower ring of the cage is also curved in cross section, as shown, so as to coöperate with the channels 23, in giving the water an outward radial exit from the cage.

About midway of the width of the lower end or ring of the cage, an annular shoulder 24 is formed, which is adapted to rest upon the margin of the aperture in which the cage is seated, and from this shoulder the ring tapers to its extremity, as shown at 25. The aperture in which the cage is seated is correspondingly tapered, and this construction enables the cage to be quickly placed in its seat and removed therefrom. When the cage is placed in its seat it is held therein against accidental displacement, in the following manner: The cage plate 20 is provided with a central threaded aperture 26, in which is screwed an ordinary cap screw or a set screw 27, or a screw 28, having secured upon its upper end an arm 29, the screws 27 being used in connection with the upper cages, and the screws having the arms 29, with the lower cages. The screws 28, are adjusted to bear against the under side of the water cap, as shown in Fig. 1 when the said cap is placed upon the valve plate, and in this way the lower cages are held securely in their seats. The screws 28, provided with the arms 29, are used in connection with the lower cages, the arms being adapted to bridge the openings, in which the upper cages are placed, and bear against the under side of the valve plate, the said openings being directly above the lower cages. The ends of the arm 29 are preferably upturned, as shown at 30, and the upturned portions engage the under side of the said valve plate. This construction provides a positive and convenient manner of securing the cages. The lower ring 17, of the cage, is thicker than the upper ring, and a circular groove 31 is formed in its horizontal face, adjoining the vertical bars 19, which forms a raised circular shoulder 32 at the inner margin of the ring, which constitutes the valve seat. Upon this seat rests a disk valve 33, of any suitable material, but a rubber disk is preferably employed, and in order to stiffen the same and at the same time to protect its marginal edge against wear, a metal ring 34, T-shaped in cross section, is molded into the valve, as shown in Fig. 8, the horizontally disposed member of the ring extending into the valve, while the vertically disposed member or band portion thereof encircles the periphery of the valve and forms a wearing surface. By its construction, the metal ring 34 is prevented from becoming detached from the valve. The ring is adapted to contact with the bars of the cage, so that the valve will be guided in its movements by the said bars, and also will be maintained in a position concentric with its seat. The valve is normally held upon the seat by a coil spring 35, which is interposed between the valve and the cap 20.

In order to prevent uneven tension upon the valve by the spring and the consequent tendency toward cocking of the valve, either a disk or a ring 36 may be placed upon the valve, as shown in Fig. 2, the said disk or ring being provided with a circular groove 37, which is adapted to receive the lower coil of the spring, and the upper end of the spring is bent up at right angles, and inserted in a hole in the cap 20, which holds the spring against either lateral or rotative movement. Fig. 7 illustrates another modification for accomplishing this purpose. In this construction the cap 38 is provided with a depending band 39, which is designed to engage telescopically with a cup 40, which rests upon the valve. The spring 35 is confined within the housing formed by the cap band and cup, and by the telescopic engagement of these parts the valve is prevented from cocking.

In Figs. 5 and 6, the spider portion of the valve seat is eliminated, and a metal valve 41 is employed, having a central depending spur or lug 42, which is pointed, as shown, and curved in outline, so as to divide and direct the water so that it will exert an even pressure upon all points of the under side of the valve and pass out through the cage in a uniform radially flowing stream.

The operation of the pump shown in Fig. 1 is as follows: When the piston moves rearward, water is drawn through the intake 1, and up through the lower valves into the water chamber 4, and cylinder 3, the upper valves remaining closed. On the opposite stroke of the piston, the water is expelled from the cylinder chamber 4, through the upper valves and into the discharge chamber 8, the lower valves remaining closed, and from this chamber the water passes out through the outlet 9, the air in the chamber 10 serving to cushion the water forced into the outlet chamber, such an arrangement being common in pumps of this character.

By the construction hereinabove described, the valves are prevented from wearing unevenly, the efficiency of the pump is thereby increased, and the valves are easily removed and replaced when required.

Having described my invention, what I claim as new and desire to secure by Letters Patent is:

1. In a device as specified, a cage comprising upper and lower ring members, connected by integral bars, a removable cap in the upper ring member, the lower ring member being provided with an annular shoulder from which point it tapers to its extremity, said tapered end being adapted to enter a corresponding seating aperture for the cage, a vertically adjustable element in said cap adapted to engage an abutment thereby to hold said cage in its seat, a valve seat in the lower end of the cage, a disk valve in the cage, a coil spring interposed between the valve and cap for normally holding the valve on its seat, and means for dividing and directing the water flowing through the same.

2. In a device as specified, a cage comprising an upper ring member, a lower ring member having an annular shoulder, from which point it tapers to its extremity, said tapered portion being adapted to enter a corresponding seating aperture, and bars connecting said ring members, a removable cap in the upper ring member, a vertically adjustable element threaded to the cap for engaging an abutment to hold the cage in its seat, a seat in the bottom of the cage comprising an integral circular shoulder, and arms which radiate from a common center and are integrally connected with the shoulder, said arms being knife edged on their under sides, and the convergence of the said arms forming at their junction intervening channels having an upward and outward inclination from the point of intersection of the knife edges, a disk member in the cage, and a spring interposed between the cap and valve to normally hold the same upon its seat.

3. In a device as specified, the combination with a cage comprising upper and lower band members connected by bars, a valve seat being formed in the lower band member, of a resilient disk valve in said cage, a metal band surrounding the same and having an inwardly extending flange which is embedded in the peripheral surface of said valve, and a spring for normally holding said valve upon its seat.

4. In a device as specified, a cage; a cap in the upper end thereof having a vertically adjustable element therein, and a depending band, a seat in the bottom of the cage; a disk valve on said seat; a cup on the valve adapted to engage telescopically with the said depending band, and a coil spring in the housing formed by the telescoping members, adapted to normally hold the valve against its seat.

In testimony whereof I affix my signature in presence of two witnesses.

FRED H. ROBERTS.

Witnesses:
G. Sargent Elliott,
Adella M. Fowle.